United States Patent [19]

Sakuma

[11] Patent Number: 5,167,737
[45] Date of Patent: Dec. 1, 1992

[54] ANTI-SKID DEVICE FOR AUTOMOBILE TIRES

[75] Inventor: Kiyoshi Sakuma, Miyagi, Japan

[73] Assignee: Kabushiki Kaisha Carmate, Tokyo, Japan

[21] Appl. No.: 624,651

[22] Filed: Dec. 10, 1990

[51] Int. Cl.$^5$ .............................................. B60C 27/10
[52] U.S. Cl. .............................. 152/219; 152/213 R; 152/221; 152/233
[58] Field of Search .............. 152/213 R, 213 A, 216, 152/217, 218, 219, 221, 222, 225 C, 231, 233, 234, 235, 236, 237, 239, 241, 243; 24/68 CT, 68 TT, 68 CD; 59/88, 89; 403/43, 44

[56] References Cited

U.S. PATENT DOCUMENTS

| | | | |
|---|---|---|---|
| 1,316,873 | 9/1919 | Berndt | 152/217 |
| 1,445,598 | 2/1923 | Kleineck | 24/68 TT |
| 2,304,318 | 12/1942 | Sava | 152/242 |
| 3,295,582 | 1/1967 | Hernikl | 152/241 |
| 3,844,324 | 10/1974 | Kondo et al. | 152/219 X |
| 3,895,664 | 7/1975 | Muller | 152/219 X |
| 4,130,155 | 12/1978 | Barnett et al. | 152/217 |
| 4,182,392 | 1/1980 | Müller | 152/219 |

FOREIGN PATENT DOCUMENTS

| | | | |
|---|---|---|---|
| 736697 | 5/1943 | Fed. Rep. of Germany . | |
| 673623 | 3/1939 | Fed. Rep. of Germany | 152/241 |
| 784307 | 7/1935 | France . | |
| 820171 | 11/1937 | France | 152/241 |
| 248204A | 2/1990 | Japan . | |

Primary Examiner—Michael W. Ball
Assistant Examiner—Francis J. Lorin
Attorney, Agent, or Firm—Nilles & Nilles

[57] ABSTRACT

An anti-skid device for automobie tires having a plurality of members joined together with hooks wherein mutually spaced tightening end portions of the anti-skid device body which extend radially inward along the side surfaces of a tire when the device body is set on the tire are connected to each other by a length-variable fastener consisting of hooks connected at one ends thereof to the opposed tightening end portions, and a plate having holes in its base portion and pivotably supporting the other ends of the hooks in different holes therein. A length of separation between the opposite tightening end portions can be set smaller than the free length thereof by rotating the plate.

15 Claims, 13 Drawing Sheets

PRIOR ART

FIG. 15
PRIOR ART

ANTI-SKID DEVICE FOR AUTOMOBILE TIRES

BACKGROUND OF THE INVENTION

1. Field of the Invention

This invention relates to an anti-skid device for automobile tires.

2. Description of the Prior Art

Figure 14:
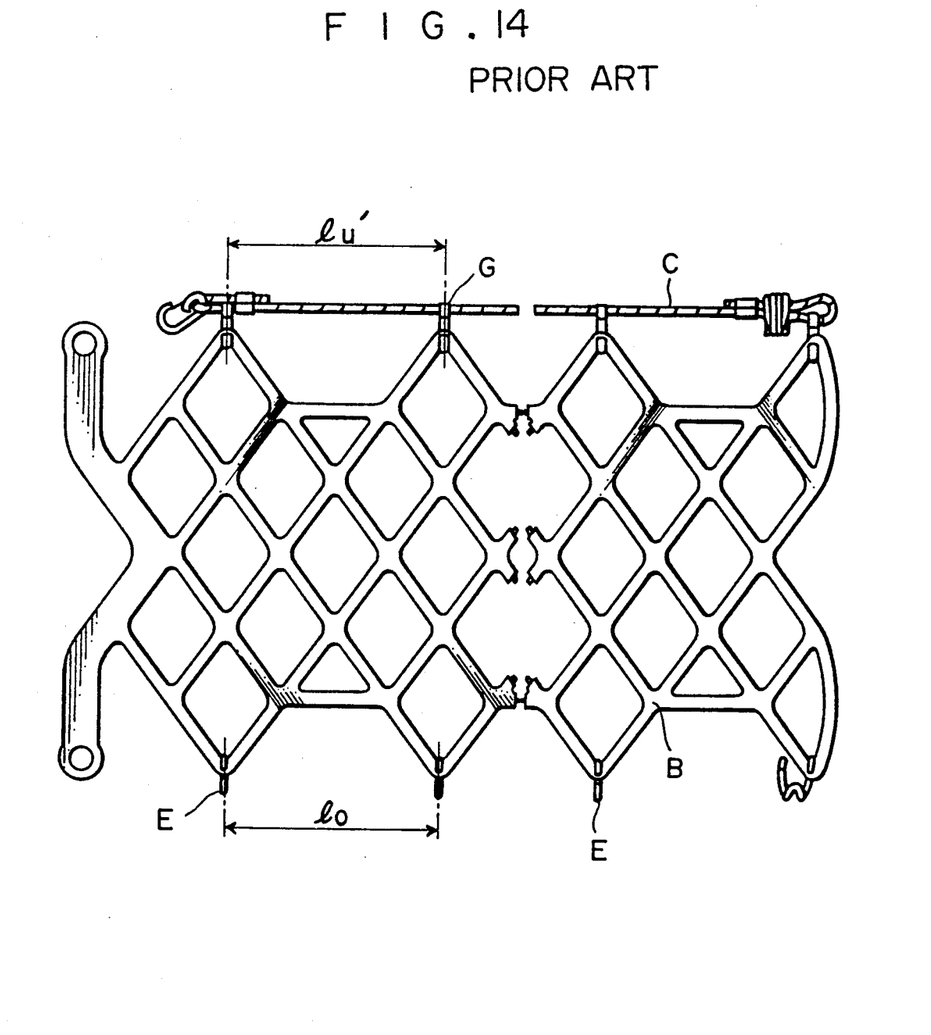
FIG. 14 is a plan view of an anti-skid device body in a conventional anti-skid device for automobile tires.
Figure 15:
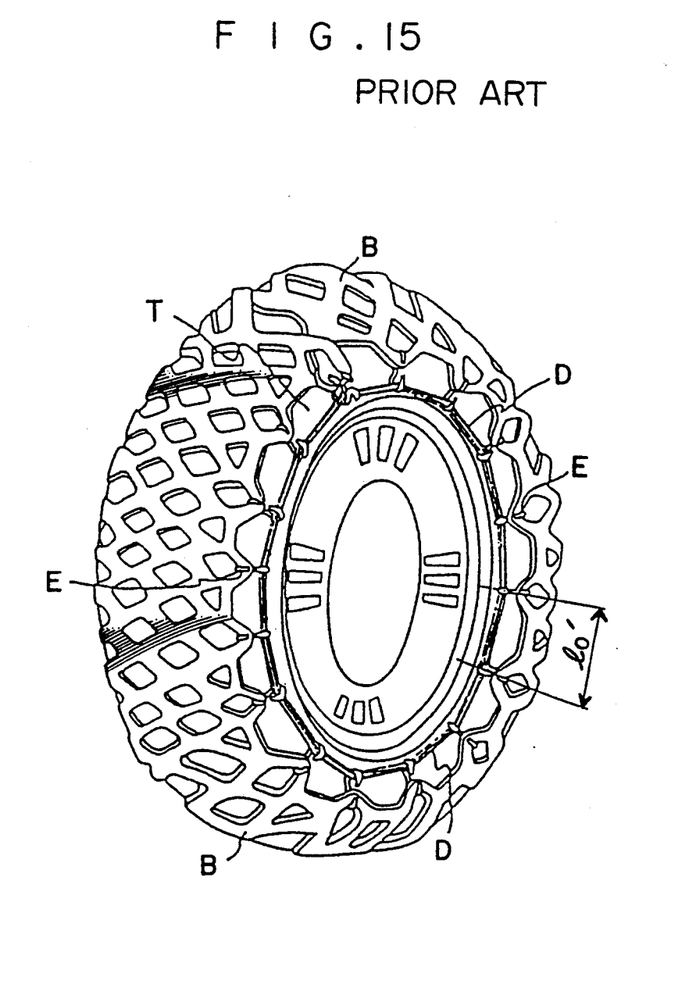
FIG. 15 illustrates the conventional anti-skid device in an assembled state for automobile tires.

The conventional anti-skid devices for automobile tires which have mainly been used are the anti-skid devices disclosed in Japanese Patent Publication Nos. 13337/1983 and 49366/1983. In these examples, an inner rope C is fixed via inner metal members G or directly to the inner side surface of a tire skid preventing net body B as shown in FIG. 14, and the tire skid preventing net body B is put over a tire T with the inner rope C fixed to the tread thereof. Both ends of this net body B are then joined together by a suitable method so that the net body B extends annularly. The inner side surface portion of the net body B is then tightened with the rope C, and the outer side surface portion thereof with a setting strap D via outer metal members E to set the anti-skid device as shown in FIG. 15.

However, according to this method, hooking the setting strap D on a plurality of outer metal members E one by one takes much time and labor.

This setting strap D in use is designed so that it can be handled without much pulling force, taking a female user into consideration. Another reason why the setting strap D is made in the mentioned manner resides in that, if the strength of the setting strap D is set excessively high, the rope C used on the inner side surface of the net body B would be broken. It has been considered impossible for this reason as well that the strength of the setting strap D be set excessively high. Therefore, when a centrifugal force is applied to the tire skid preventing net body B while the vehicle travels, the setting strap D expands to cause the net body B to be lifted and slipped on the tire T. Consequently, the net body B becomes rather loose with respect to the tire T, and variation of position of the net body and a locally concentrated load occur to cause the net body B to be locally broken or displaced, making such an anti-skid device unfit for use.

Especially, in the case of a non-metallic net type anti-skid device which is in recent years growing to be a leading anti-skid device of this kind, the slipping of a tire skid preventing net body B due to a centrifugal force from the tire T causes a decrease in the durability of the device, and the upward movement of the net body B which brings the net body B into contact with the inner surface of the fender and results in the breakage of the net body B. These inconveniences suggest the important points of designing the anti-skid device. On the other hand, it is necessary that the level of the tightening force occurring in the setting strap D as a whole for the prevention of the slipping of the net body B be increased. Under the circumstances, there is a limit to the tension of the setting strap D which can be hooked manually with ease on the outer metal members E, and the tension of such a single setting strap D cannot prevent the slipping of the tire skid preventing net body B from the tire T which occurs due to the centrifugal force exerted on the net body B when the tire T is rotated.

Therefore, two to three pieces of setting straps the tension of which is set to the very limit of the range of levels at which the setting straps D can be hooked manually on the outer metal members are generally used. Since the operation of hooking the increased number of setting straps D one by one on each of a plurality of outer metal members E sequentially causes an increase in the length of time and quantity of labor for carrying out the attaching and detaching of the anti-skid device to and from a tire, it hinders the further popularization of this kind of anti-skid device which has been reconsidered in view of the prospective total abolition of spike tires.

The conventional tire skid preventing net body B shown in FIG. 15 is formed flat as shown in FIG. 14, and the tightening portions thereof which are to be applied to the inner side surface of a tire T are then set to a pitch lu' at which these tightening portions are held finally on the tire by using inner metal members G. Regarding the tightening portions of the net body B which are to be applied to the outer side surface of the tire T, the diameter of a circle connecting these tightening portions held on the outer side surface of the tire T by hooking the setting strap D on the outer metal members E and tightening the same is reduced so that the pitch lo of these tightening portions of the net body B in a flat-extending state becomes lo'.

Unless a sufficiently large pitch of the tightening portions of the tire skid preventing net body B which correspond to the outer side surface of a tire is secured, the net body B cannot be set on the tire. Therefore, the net body B is set on the tire T with the outer tightening portions spaced with the same pitch lo as that when the tightening portions of the net body B is laid in a flat-extending state. Thus, a lot of energy is required to reduce the pitch of the tightening portions corresponding to the outer side of the tire to the level at which these tightening portions are finally held on the tire, and putting the net body over the tire and fixing the same thereto in this manner also causes the tightening portions to be swollen greatly by the centrifugal force.

SUMMARY OF THE INVENTION

An object of the present invention is to provide an anti-skid device for automobile tires which is free from the above-mentioned drawbacks.

The anti-skid device for automobile tires according to the present invention consists of anti-skid device body, having a plurality of members and detachable joint hooks for joining members of the device body together, the anti-skid device body having a plurality of mutually spaced tightening end portions which extend radially inward along the side surfaces of a tire when the device body is set on the tire, the ends of adjacent tightening end portions being connected to each other by a fastener so that a length of separation between the ends can be set smaller than the free length of separation thereof by the fastener, the length of the fastener being variable, the length-variable fastener consisting of hooks connected at one ends thereof to the opposed tightening end portions, and a plate having holes in its base portion and pivotably supporting the other ends of the hooks in different holes therein, the length between the opposed tightening end portions being reduced by turning this plate.

The above and other objects as well as characteristics of the present invention will become apparent from the following description of the preferred embodiments taken in conjunction with the drawings.

DESCRIPTION OF THE PREFERRED EMBODIMENT

Figure 1:
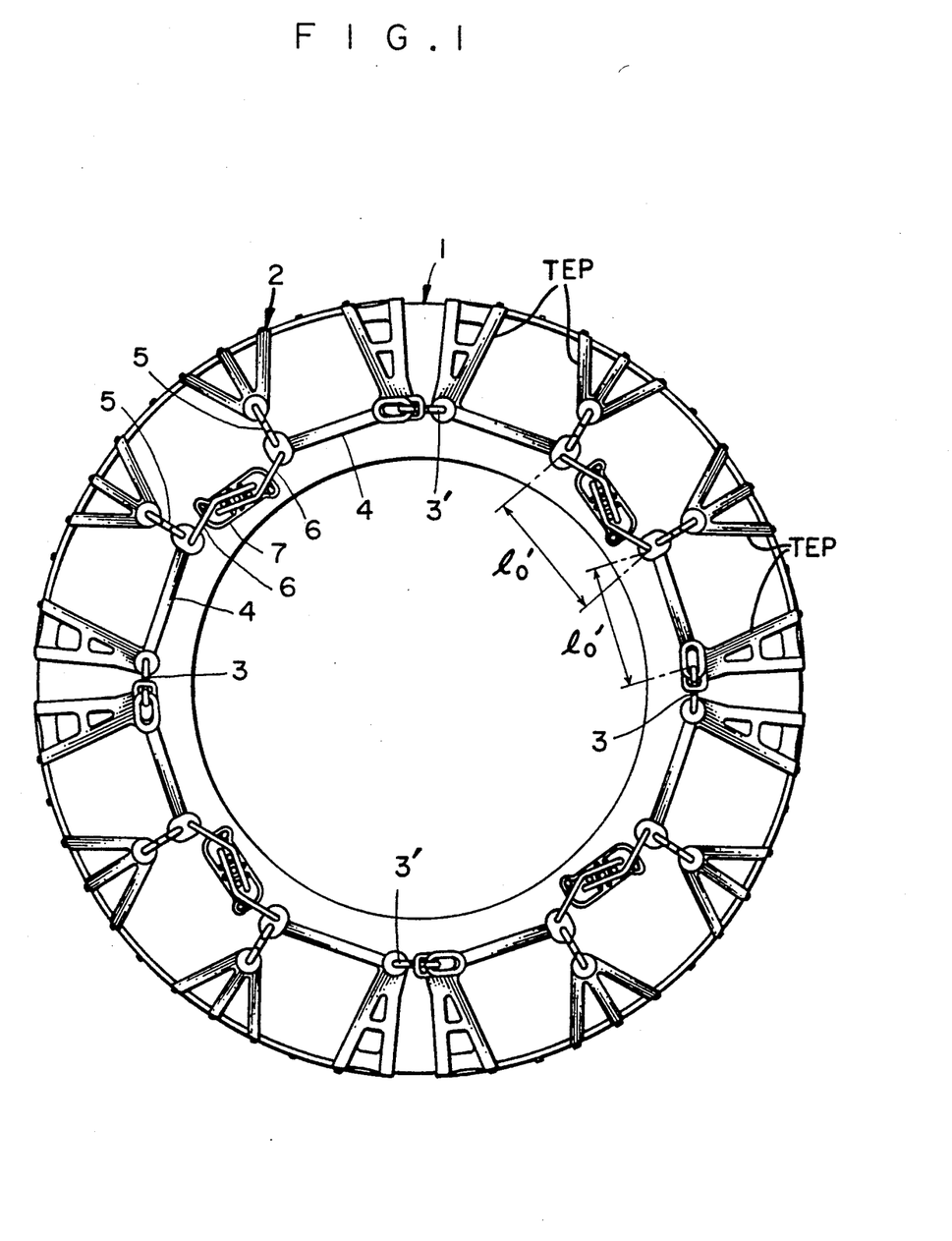
FIG. 1 illustrates the anti-skid device in an assembled state for automobile tires according to the present invention.

An embodiment of the present invention will now be described with reference to the drawings. The anti-skid device for automobile tires according to the present invention has a quartered non-metallic anti-skid device body 2 in which the four device body members are joined together by joint hooks 3, 3' in four positions on the outer circumferential portion of a tire as shown in FIG. 1. Both of the joint hooks 3' among these joint hooks in four positions can be attached to and detached from the device body members.

Figure 2:
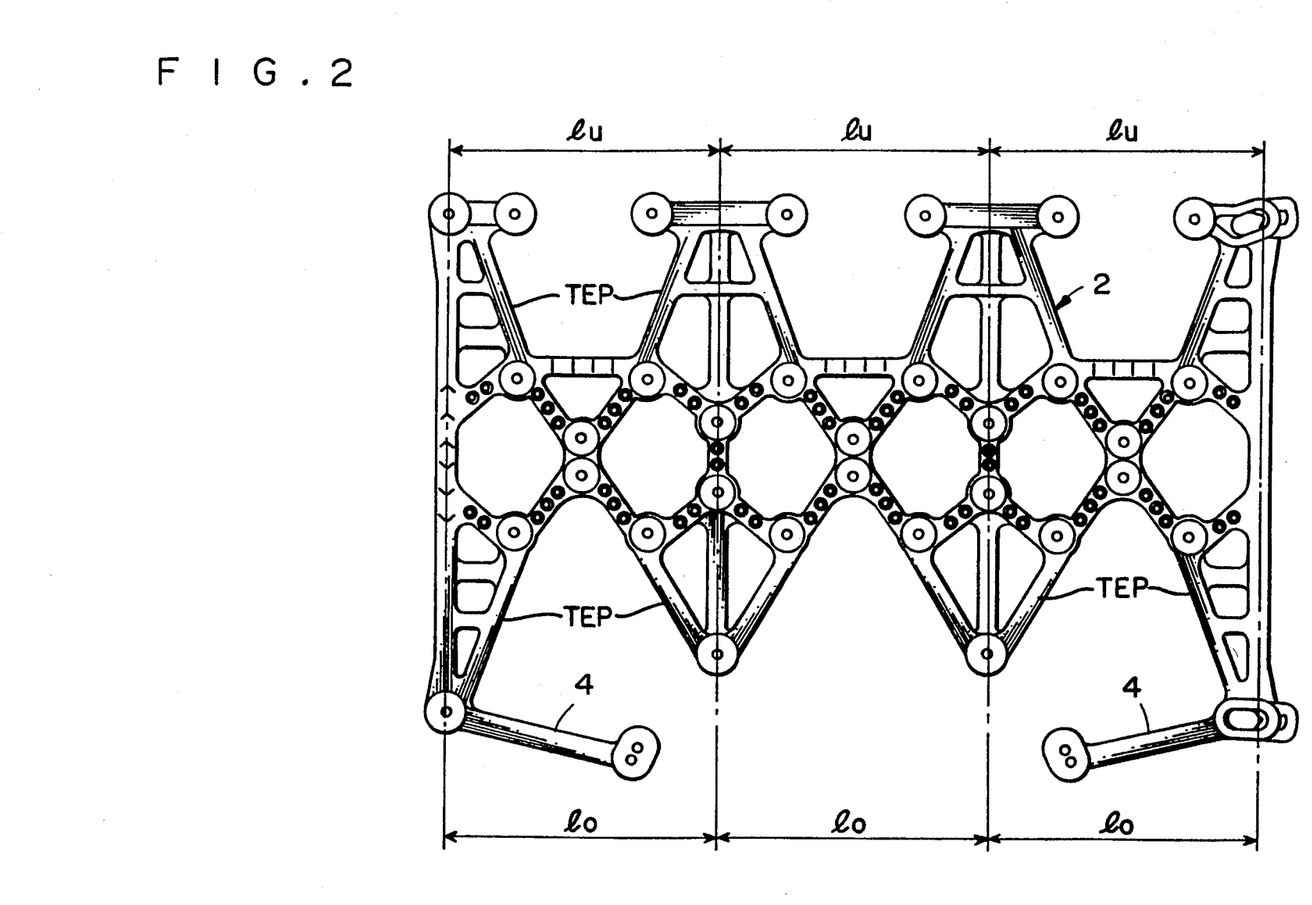
FIG. 2 is a plan view of an anti-skid device body of the anti-skid device for automobile tires according to the present invention.

As shown in FIG. 2, the anti-skid device body 2 has a plurality of mutually spaced tightening end portions TEP which are to extend inward along the inner side surface of a tire when the device body 2 is set on the tire, and integrally formed having bendable joints extending toward each other from first and fourth tightening end portions among the tightening end portions spaced with a pitch of lo and applied to the outer side surface of a tire. The length of this connecting projection 4 is lo', and the free end of the connecting projection 4 is finally joined to the adjacent tightening end portion by a first hook 5, as shown in FIG. 3.

Figure 3:
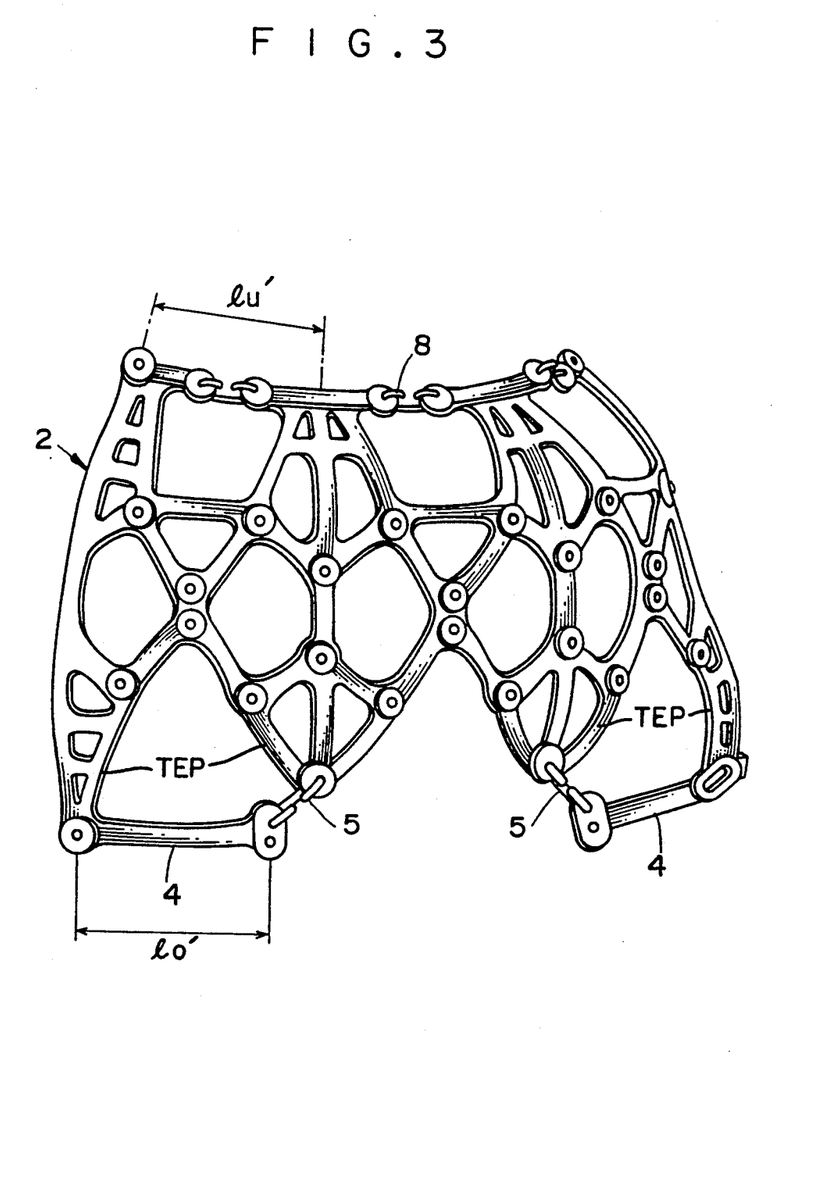
FIG. 3 illustrates parts of the anti-skid device body which are connected together by a first hook and bent.
Figure 4:
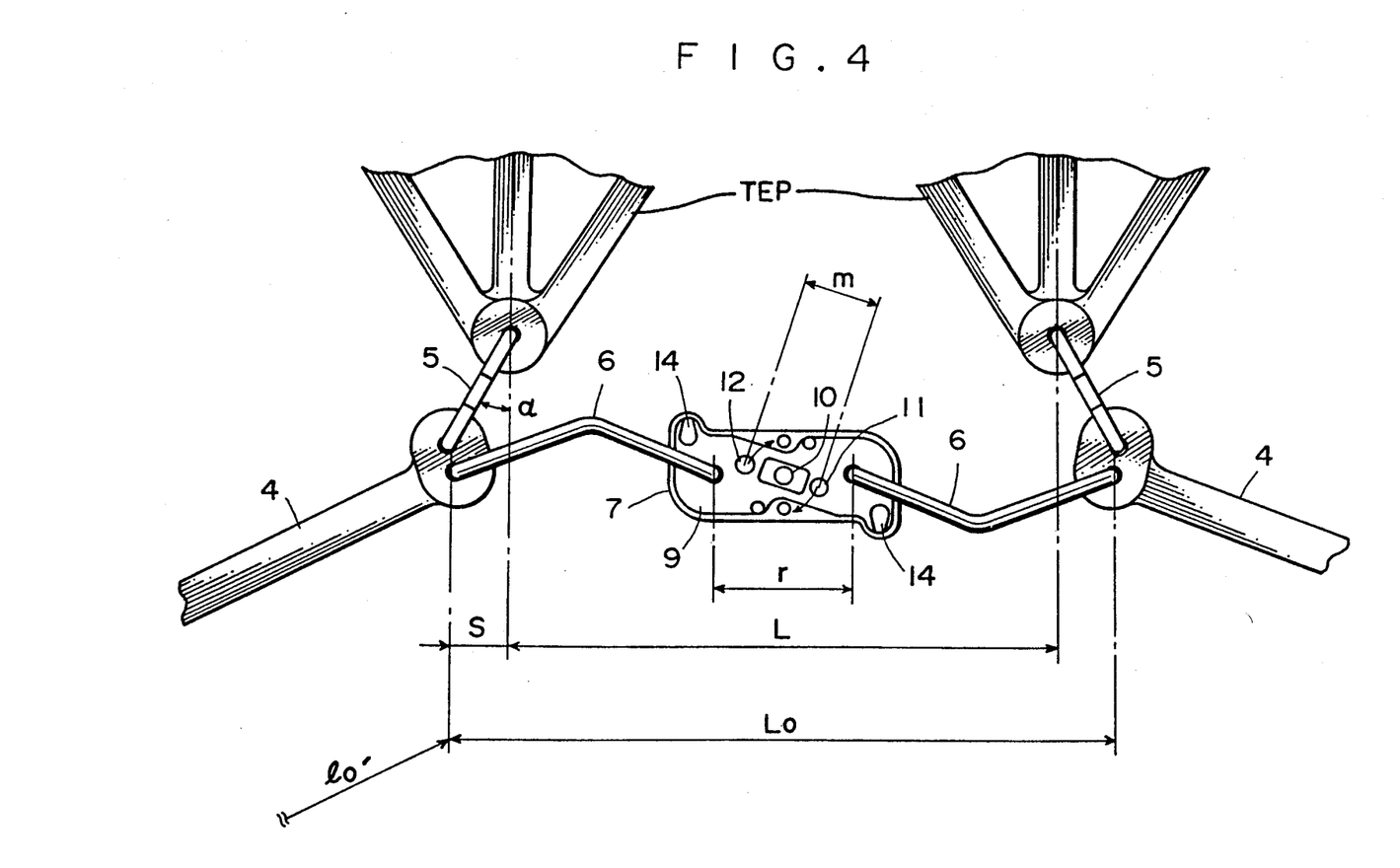
FIG. 4 illustrates a fastener in a released state in the anti-skid device for automobile tires according to the present invention.

The connecting projection 4 has two holes in its free end portion as shown in FIGS. 2-4, and is joined at the hole therein which is closer to the adjacent tightening end portion to the same tightening end portion by the hook 5. The connected part thus formed constitutes a bendable joint.

The anti-skid device for automobile tires according to the present invention further has fasteners each of which consists of second hooks 6 and a plate 7, and each of which is provided with a power doubler for reducing the length lo, which is in a largely free state when the anti-skid device body is put over a tire with the outer tightening end portions thereof on the outer side surface of the tire, to the length lo', a level required when these tightening end portions are finally set. The bendable joints referred to above are moved in conjunction with the rotation of the plates 7.

Each of the device body members of the quartered anti-skid device body 2 is formed flat as shown in FIG. 2. The pitch lo of the laid of the member of the device body 2 which is on the outer side of the tire and that lu of the portion of the member which is on the inner side of the tire are equal to each other. This member of the device body 2 is assembled so that it forms a three-dimensional curved structure when the connecting projections 4 and tightening end portions are joined together by using first connecting hooks 5 and fastening hooks 8 on the side of the inner surface of the tire as shown in FIG. 3.

The length of the fastening hook 8 is set so that the pitches lo', lu' corresponding to those lo, lu become equal to each other when the member of the anti-skid device body 2 is put over the tire 1, i.e., in the condition shown in FIG. 3.

In the anti-skid device for automobile tires according to the present invention, some of the fasteners used on the outer side surface of the tire are made in advance to a length required when the device body is finally set. Accordingly, some of the fasteners on the outer side surface of the tire are made so that they can be simply attached to and detached from the device body 2.

Figure 5:
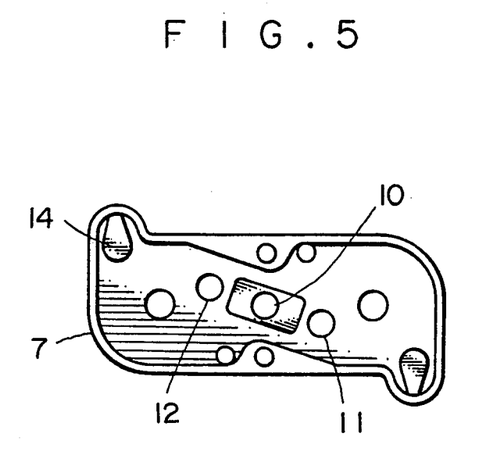
FIG. 5 is a plan view of a plate in the fastener.
Figure 6:
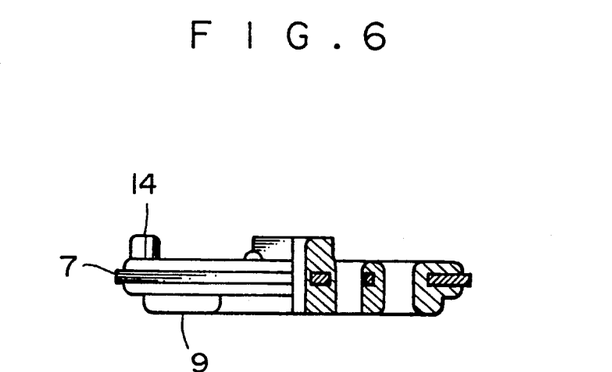
FIG. 6 illustrates a plate assembly in the fastener.

In the power doubler-carrying fastener used in the present invention, one end portion of a second hook 6 is connected to an end portion of a connecting projection 4 on the outer side of the tire so that the hook 6 extends in the same direction as the connecting projection 4 as shown in FIG. 4. The other ends of the second hooks 6, extending toward each other are fixed in two holes, which are made in the base portions of the plate 7 so as to be spaced by a distance r, in such a manner that the hooks 6 can be rotated. As shown in FIG. 5, the plate 7 is formed flat and provided with a plurality of holes. The plate 7 is combined unitarily with a resilient member 9 as shown in FIG. 6.

Figure 7:
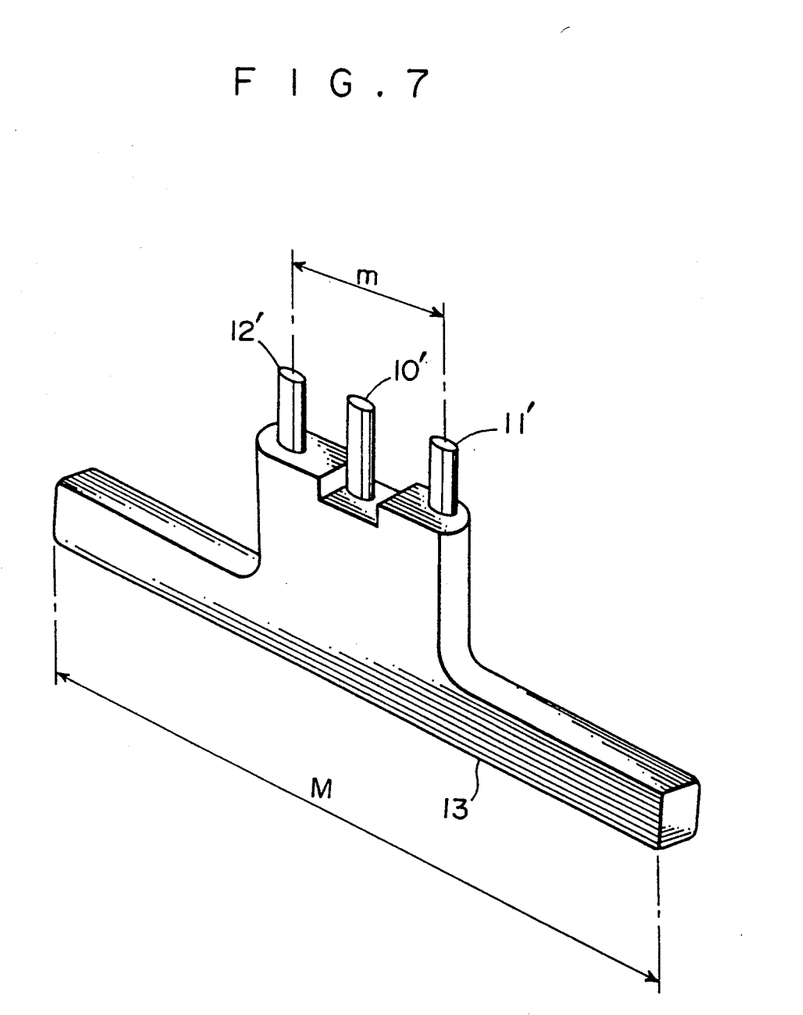
FIG. 7 illustrates a special tool for turning and setting the fastener.

The plate 7 is provided with a first hole 10 in the center of pivotal movement thereof, and symmetrically arranged second and third holes 11, 12 spaced from each other by a distance m, and adapted to be turned by a special plate turning jig 13 shown in FIG. 7 and having projections 10'–12' corresponding to these holes 10, 11, 12. The special jig 13 is provided with a plate turning handle of M in length formed thereon.

When the handle of the special jig 13 is turned around the hole 10 with the projections 10'–12' thereof inserted into the three holes 10–12 in the plate 7 correspondingly, the force of the handle is amplified in the ratio of M/m around the first hole 10 and works in the direction in which a distance Lo shown in FIG. 4 is reduced. When the plate 7 is turned reversely at 180° to be put in the condition shown in FIG. 8, the distance Lo is reduced to lo'=Lo−2r.

The connecting projections 4 and tightening end portions are joined together by first hooks 5 to form bendable joints. Therefore, the distance 2r reduced by the turning of the plate 7 is divided uniformly between the portions to be fastened of the device body. When the plate 7 is turned, the distance between the portions to be fastened of the device body decreases uniformly as an angle α between the first hook 5 and the relative tightening end portion decreases, and, in the condition shown in FIG. 8, the distance between the opposed portions to be fastened of the device body becomes equal to a final required level lo'.

In the anti-skid device for automobile tires according to the present invention, the distance between the opposed portions to be fastened is set to Lo which is somewhat shorter than the pitch lo of the tightening end portions of the device body in a flat condition shown in FIG. 2 with the lengths of the hooks 5, 6 and the distance r between the outermost holes in an initial free state. At this point, Lo is an unfastened length as illustrated in FIG. 4. That is, Lo is a connected length to be later tightened. Accordingly, even when the connecting projections are fixedly set to the length lo' at which the device body is finally fastened to a tire, the device body can be easily attached to and detached from a tire.

When the plate 7 is turned, so that Lo becomes equal to lo', the device body is put in a tire-fastened state shown in FIG. 1, and the fastened portions of the device body are effected to form a closed loop of force, whereby the device body attains a stable fastened state.

Since the first hooks 5 in this condition are directed toward the center of rotation of the tire, a tensile force toward this center is imparted to the tightening end portions to which the hooks 5 are fastened, whereby the anti-skid device body is stabilized.

The sizes of various parts of the anti-skid device body will now be calculated taking a tire 165R13 of general sizes as an example.

The outer diameter of a 165R13 tire is 596 mm, and the diameters of circles connecting the outer and inner portions to be fastened of an anti-skid device body to be put over this tire are set equal, i.e., they are set to 464 mm. When the length of each joint hooks 3, 3' for connecting the members of the anti-skid device body 2 is set to 30 mm, the length lo' in the device shown in FIG. 1 is:

$$lo' = \frac{464 \times 3.14 - 4 \times 30}{12} \div 111 \text{ mm}$$

The length lo in the device body in a flat extending state shown in FIG. 2 is:

$$lo = \frac{596 \times 3.14 - 4 \times 30}{12} \div 146 \text{ mm}$$

Accordingly, the squeezing of lo−lo'=35 mm of the device body per portion to be fastened thereof is required.

The length of each connecting projection 4 is set from the beginning to lo' which is required for a final device body fastening operation.

The first hook 5 by which a connecting projection 4 and a tightening end portion are connected together moves like a link. Therefore, when the first hook 5 forms an angle $\alpha$ as shown in FIG. 4, the size of the portion to be fastened of the connecting projection 4 increases by a distance S to become lo'+S.

On the other hand, the size of the portion to be fastened of a plate 7 decreases by the distance S to become L=Lo"2S. Since the length of the first hook 5 is set so as to satisfy relation of lo'+S=L, the distances between three portions to be fastened are equal.

Regarding the power doubler-carrying fastener, Lo is set to 189 mm as shown in FIG. 4, in such a manner that the fastener expands 43 mm more than lo=146 mm which is the length thereof in a free state, taking the necessity of attaching and detaching the fastener easily to and from the device body into consideration.

Namely, a size difference Lo−lo'=189−111=78 mm is distributed equally to three portions (78/3=26 mm each). Consequently, the distance between the portions to be fastened of opposed connecting projections becomes lo'+26=137 mm, while the distance between the portions to be fastened of the plate 7 becomes L=Lo−2S= 189−2×26=137 mm, so that lo'+S=L. Thus, when the plate 7 is turned to cause the distance Lo to be reduced to lo', the distances between the three portions to be fastened become equal, i.e., decrease to lo'.

In order to squeeze the portions to be fastened of the device body from Lo=189 mm to lo'=111 mm by the power doubler-carrying fasteners, r may be set equal to (189−111)/2=39 mm.

If the length M of the handle of a special plate-turning tool is set to M=160 mm, the rotary force applied around the center of rotation is amplified four times, i.e., it becomes M/r=160/39≈4. The distances r=39 mm and M=160 mm can be secured without any dimensional troubles.

If the distance m between the plate-turning holes is set to m=20 mm, the rotary force generated by the handle becomes r/m=39/20≈2, so that a force the level of which is two times as high as the force imparted to the holes in which the second hooks 6 are supported pivotably on the plate 7 is imparted to the plate-turning holes 11, 12 and plate-turning projections on the handle. Accordingly, the strength of each part is sufficiently high.

A final fastening force generated for forming fastened portions by utilizing rubber belts in regular cases is around 20 kg f. If this force is obtained by using the handle of the plate-turning tool, a four-time-increased force is obtained as mentioned above, so that the rotary force becomes 5 kg f. This level of rotary force can be generated comparatively easily in a usual case by a less powerful person in view of the nature of the work.

The rotary force imparted in this operation to the plate-turning holes 11, 12 is 10 kg f, which this anti-skid device body can withstand sufficiently, and it does not give rise to any problems.

The first hole 10 and projection 10' are provided correspondingly to the centers of rotation of the plate 7 and handle of the plate-turning tool 13. Since the handle is turned necessarily around the mentioned centers, the handle turning operation can be carried out smoothly, and the disengagement of the projections 11', 12' of the handle from the plate-turning holes 11, 12 can be prevented.

Figure 9A:
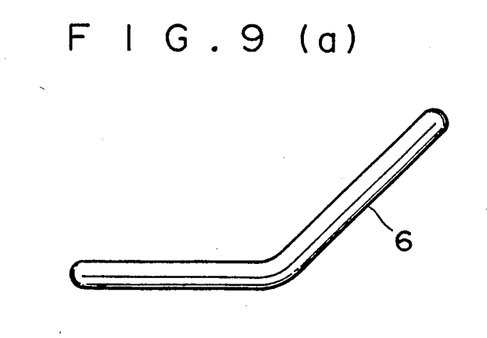
FIGS. 9(a)–9(c) illustrate each part of a second hook for the fastener.
Figure 9B:
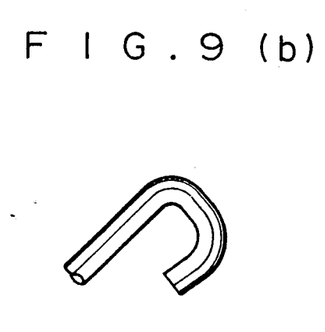
Figure 9C:
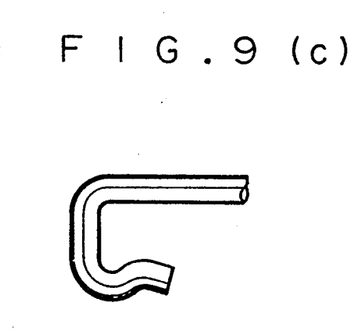
Figure 10:
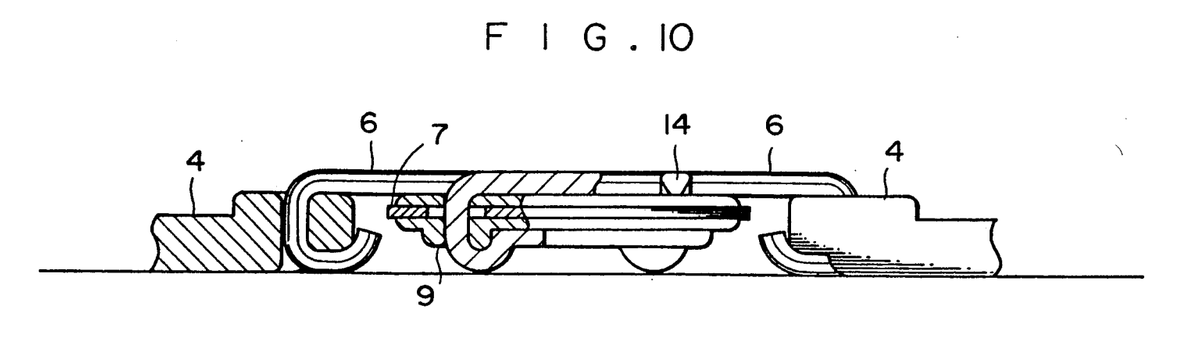
FIG. 10 is a sectional view of the fastener in a device body-setting state.

Each second hook 6 has a shape shown in Figs. 9(a)-9(c), and a sectional view of the power double-carrying fastener in a fastened state is shown in FIG. 10.

Figure 8:
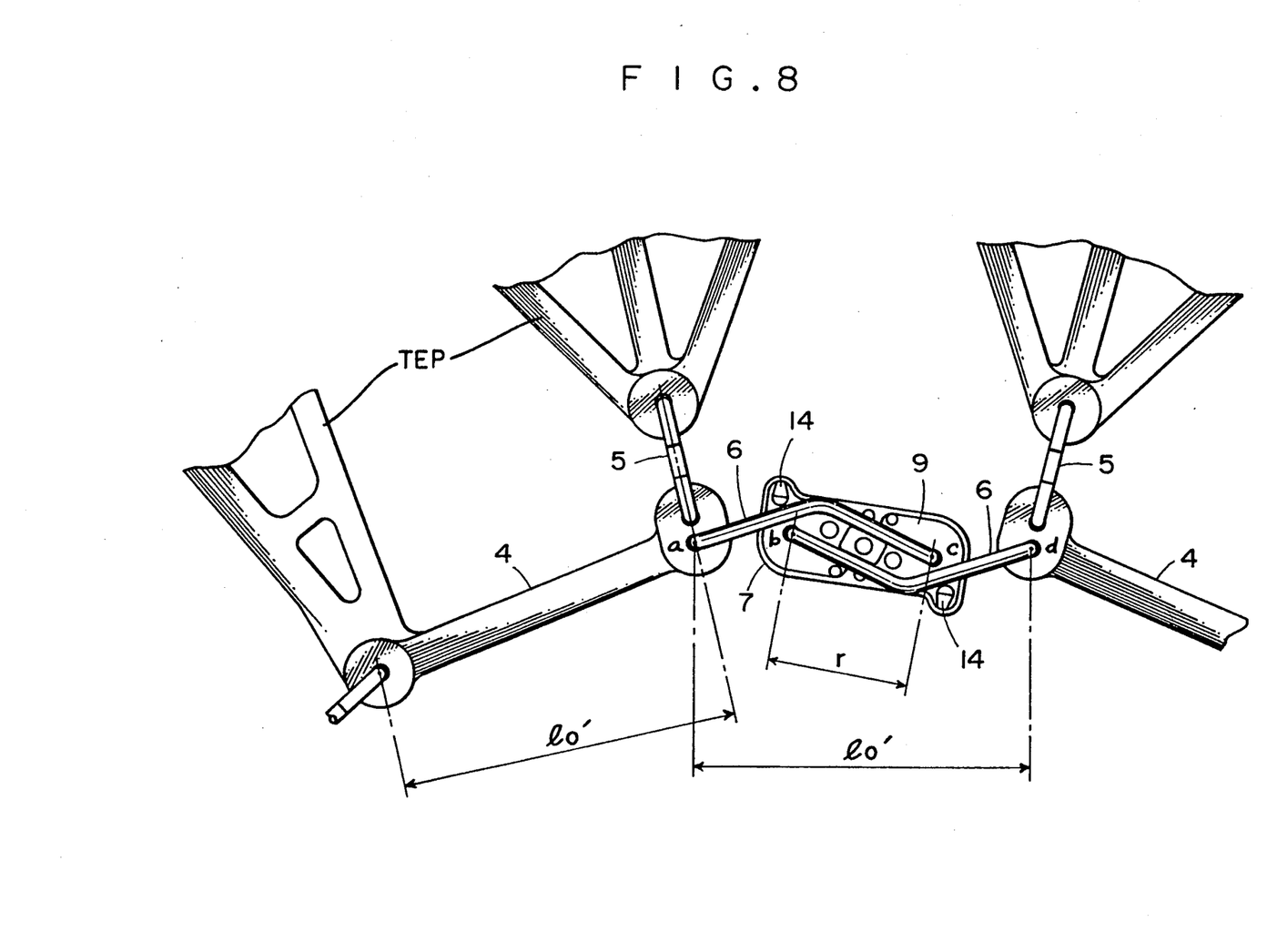
FIG. 8 illustrates the fastener in a device body-setting state in the anti-skid device for automobile tires according to the present invention.

As is clear from FIG. 8, locking projections 14 are formed on the plate 7 as a part of and integrally with the resilient member 9 so that, when the power doubler-carrying fastener is in a fastened state, the fulcrums b, c of the second hooks 6, which are supported pivotably on the plate 7, are locked and retained in such condition that these fulcrums b, c are offset each other in the device body fastening direction with respect to a line connecting the fulcrums a, d, which are on the end portions of the connecting projections 4, of the same hooks 6.

Namely, since the points b, c are in the positions offsetting each other in the direction in which the device body is turned and fastened, a force for turning the fastener in the direction opposite to the fastener unlocking direction is applied to the points b, c when a force for increasing the device body fastening distance lo' is applied to the points a, d.

As shown in FIG. 10, the portion of a second hook 6 which is between the fastening portions at both end thereof is engaged at the surface of the plate 7 which is on the opposite side of the tire surface with the locking projection 14. Accordingly, when a force for separating the anti-skid device as a whole from the tire surface occurs due to the centrifugal force generated as the tire rotates, the plate 7 the mass of which is larger than that of the second hook 6 lifts the hook 6. This can prevent the second hook 6 from disengaging the locking projection 14, and enables the second hook 6 to be locked reliably.

In order that the second hook 6 runs over the locking projection 14 to be locked, the plate 7 is rotated as it is pressed against the tire surface. Consequently, the free end of the fastening portion of the hook 6 is pressed against the tire surface, and the plate 7 as a whole including the locking projection 14 is pressed down to the tire surface due to the elasticity of the tire. Thus, the locking of the second hook can be done easily. The unlocking of the second hook 6 can also be done easily by rotating the plate 7 in the unlocking direction while pressing the same against the tire surface.

Regarding each hook used in the anti-skid device for automobile tires according to the present invention, each hook fastening hole portion of the anti-skid device body has a stepped portion which is spaced from the tire surface by a distance corresponding to the thickness of the hook as shown in FIG. 10. The surface of the hook which contacts the tire and the surface of the anti-skid device body which contacts the tire are thus set flush with each other for the purpose of preventing the tire surface pressing force based on the anti-skid device fastening force occurring when the anti-skid device is fitted firmly around the tire from being imparted to the tire in a concentrated manner due to the surface of a small curvature of the hook, i.e., for the purpose of preventing this tire surface pressing force from causing the hook and tire to contact each other, and the tire to be thereby damaged while the vehicle travels.

A method of fixing the anti-skid device according to the present invention will now be described.

Figure 11:
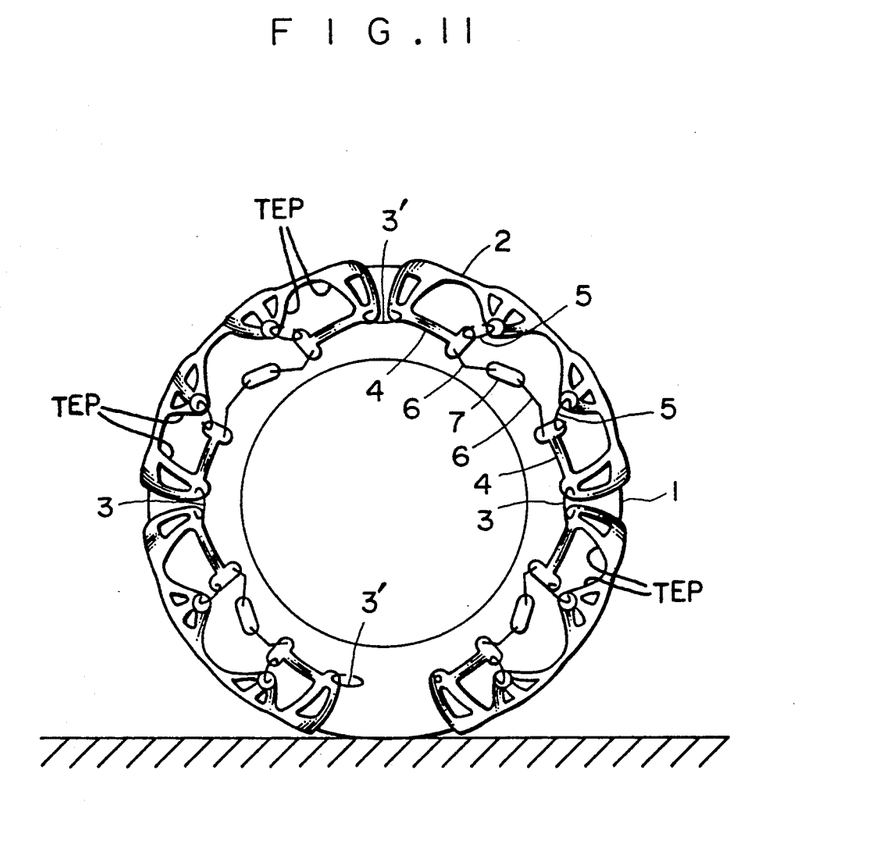
FIGS. 11 and 12 illustrate a process for assembling the anti-skid device for automobile tires according to the present invention.

First, the members of an anti-skid device body 2 are attached to a tire 1 tentatively as shown in FIG. 11. During this time, the four power doubler-carrying fasteners are all put in a free state in which the plates 7 are in the condition shown in FIG. 4.

The plates 7 of the power doubler-carrying fasteners are then turned to positions shown in FIG. 8, and fixed in a fastened state. The turning of the plates 7 during the device body attaching operation can be done easily by hand without using a special tool. During this operation, the center of curvature of each member of the device body 2 and the center of the tire 1 are aligned with each other. The tire 1 is then turned about $\frac{1}{4}$ revolution. During this device body attaching operation, the turning and fixing of the plates 7 may even be done satisfactorily in only two positions spaced from each other in the rotational direction of the tire 1.

In a conventional anti-skid device shown in FIGS. 14 and 15, a single setting strap D is hooked on several outer metal members E, and a tire 1 is then turned $\frac{1}{4}$. Since the diameter of the setting strap D in a free state is small, a tensile force is imparted to the outer fastening portion of a device body during a device body setting strap hooking operation. Consequently, the balance between the tension of the outer fastening portions and that of the inner fastening portions is lost, and, moreover, the setting strap D is moved on the outer metal members E as the tire 1 is turned. Due to these problems, the deviation of an anti-skid net body B from the center of the tire 1 occurs as the tire is turned. This makes it difficult to carry out a subsequent setting strap hooking operation.

In the device according to the present invention, the squeeze rates of the inner and outer portions to be fastened of the device body are equal. Accordingly, the length of these portions with the power doubler-carrying fasteners in four positions in a tightened state become equal. Therefore, the tension of these inner and outer portions is balanced well, and the displacement of the device body does not occur when the tire is turned.

Figure 12:
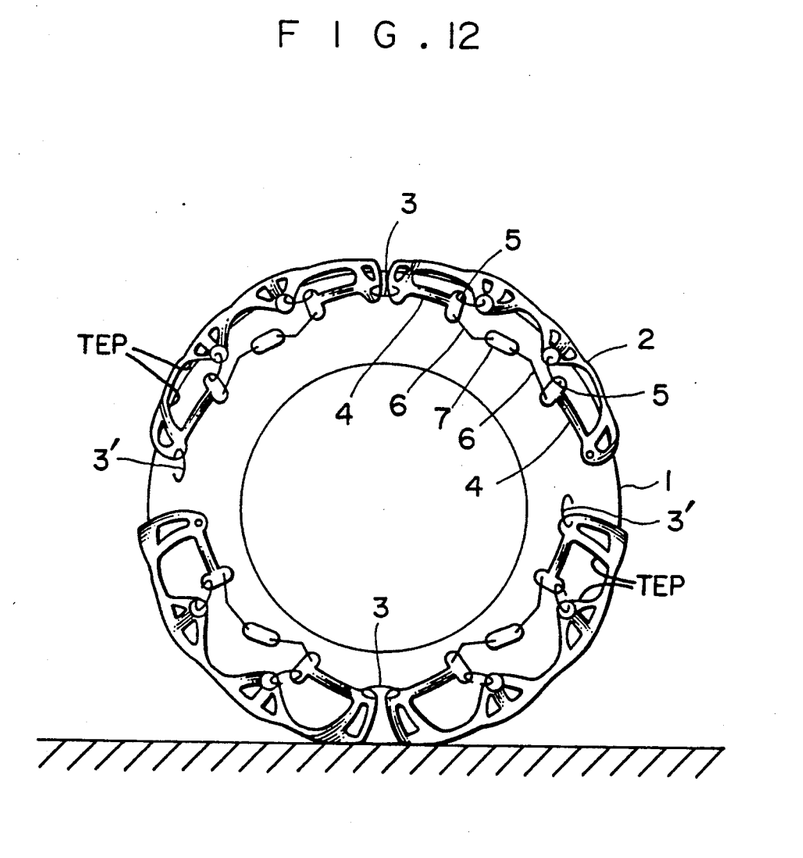

Arrangements are then made to start an operation of turning the tire $\frac{1}{4}$ revolution and then fastening the joint hooks 3' on the inner side of the tire so as to endlessly connect the inner portions to be fastened. During this time, the members of the anti-skid device body 2 are dropped onto the inner side surface of the tire so that the fastening of the joint hooks 3' can be done easily. If the power doubler-carrying fasteners are set in a free state again and two outer joint hook 3', opposed to the other are set free as shown in FIG. 12 in this operation, the endless connecting of the inner portions of the device body can be done satisfactorily.

The setting of the length Lo and the setting of the length of the first hook 5, which forms a link mechanism with the relative connecting projection 4, described with reference to FIG. 4 are done so as to make easy this operation of dropping the members of the anti-skid device body 2 onto the inner side of the tire, and enable an operation of endlessly connecting the quartered tread-covering members of the device body on the outer side as well of the tire to be carried out smoothly by fastening the outer joint hooks 3', which will be described below, to the members of the anti-skid device body 2.

After the inner joint hooks 3' are fastened to the members of the device body, the device body 2 is drawn out to the outer side of the tire.

This joint hook drawing operation is carried out with the connecting projections 4 gripped by hand, to enable the operation to be practiced easily.

The joint hooks 3' in two positions are then fastened to the members of the device body 2 so as to endlessly connect the quartered tread-covering device body on the outer side of the tire, and the power doubler-carrying fasteners in four positions are tightened in an arbitrary order to complete the operation. The outer fastened portions of the device body in this condition form a closed loop of force, and the fastened portions are fixed unitarily. Accordingly, even when the tire skids, the fastened portions of the device body 2 are not displaced, so that the displacement and separation of the device body from the tire 1 do not occur.

Since the portions to be fastened on both the outer and inner sides of a tire are fixed using the same system, the tensions of the outer and inner portions of the device body are balanced. Since the expansion of the fastened portions hardly occurs, the resistance of the anti-skid device to the centrifugal force and the durability thereof are improved markedly as compared with those of an anti-skid device employing rubber straps.

When the power doubler-carrying fasteners are in a fixed state, the squeeze distances thereof are constant in any cases. In order to offset difference in the diameter of the outer fastened portions, which is due to a difference in size of the tire or a slight displacement of the anti-skid device fixed on the tire, and generate tension, which is relatively and slightly higher than that of the inner fastened portions, in the outer fastened portions, it is preferable that the connecting projection 4 consists of a buffer structure using such a material or structure that generates elastic energy, and that they be formed to a length slightly smaller than lo'.

Figure 13:
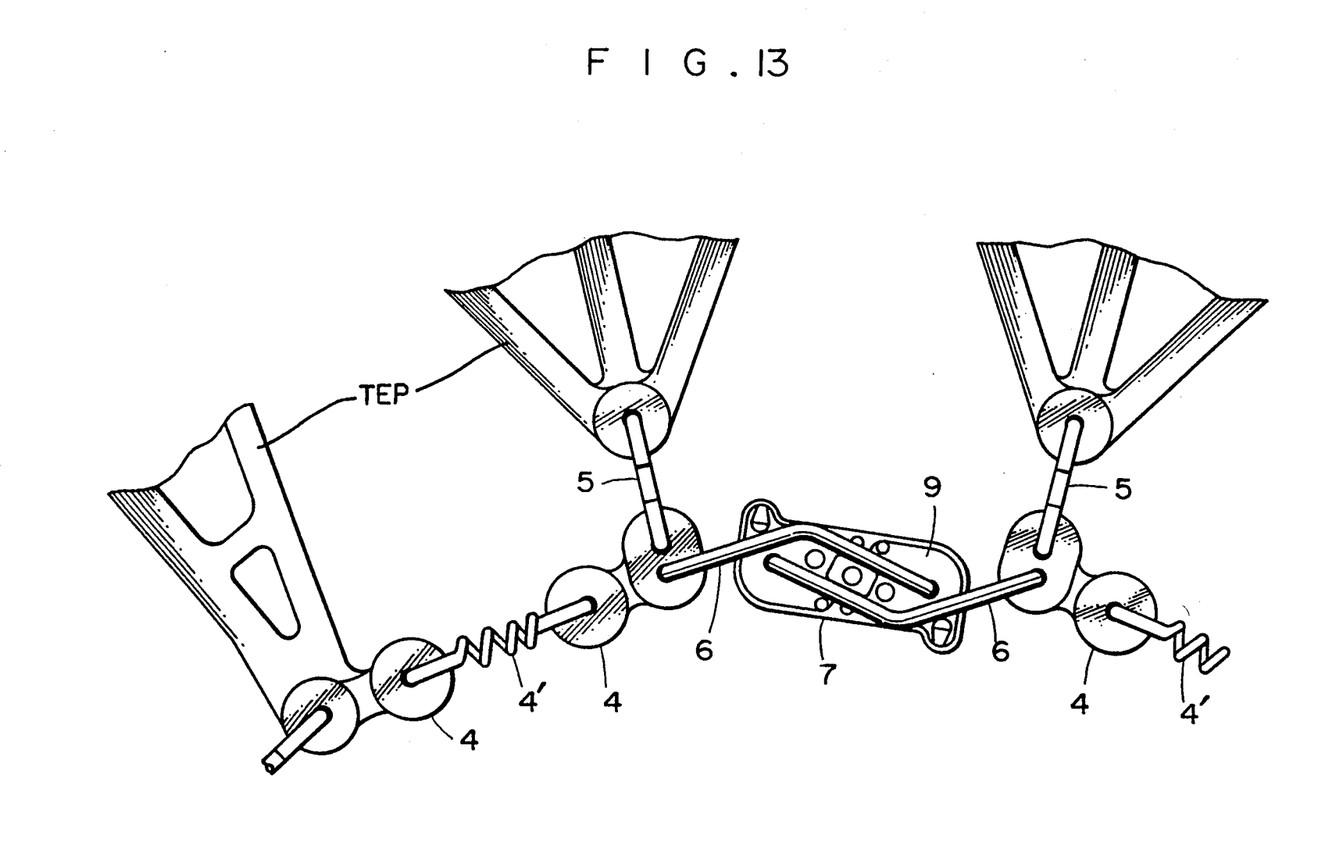
FIG. 13 illustrates another example of the fastener.

This buffer structure in the anti-skid device body 2 in the present invention including the connecting projections 4 is formed integrally out of, for example, an elastic body of polyurethane elastomer. If the connecting projections 4 are formed to such cross-sectional dimensions that enable these projections to expand more than the inner fastened portions and tread-covering portion of the anti-skid device body, satisfactory buffering connecting projections 4 can be obtained. The connecting projections 4 may also be provided with lengthwise extending spring-like buffer members 4' at the intermediate portions thereof as shown in FIG. 13.

As described above, the device according to the present invention has an excellent fixing capability, i.e., it can be fastened to a tire without requiring much time and labor. It can prevent the swelling of the fastened portions of the device body which would otherwise be caused by a centrifugal force, and which constitutes a drawback in a conventional device of this kind, improve the durability of the device and prevent the displacement and separation of the device body from the tire.

Such advantages of the present invention may be itemized as follows.

(1) While this anti-skid device is fastened tentatively to a tire and the tire is turned therefore, the displacement of the device does not occur, so that the concentricity of the portions to be fastened of the device with the tire can be obtained easily.

(2) The time and labor required to fasten rubber strap to the outer metal member in a conventional anti-skid device can be omitted.

(3) The tightening forces to the fastened portions of the device on the inner and outer sides of the tire are balanced well, so that the durability of the device is improved.

(4) Since the fastened portions are fixed unitarily, the displacement and separation of the device body from the tire rarely occur.

(5) Since hooks to which a rubber strap is secured are not provided, the anti-skid device body as a whole need not extend into radially inner portion of a tire. Accordingly, this device can be put over a low profile tire, in which the outer diameter of the tire and that of a wheel body do not differ much, in such a manner that the fastened portions do not contact the wheel body. This can prevent the wheel body from being damaged.

In the above embodiment, a net type anti-skid device body is used. However, the present invention can also be applied to a chain type anti-skid device as disclosed in Japanese Utility Model Laid-Open No. 68,809/1985 and Patent Laid-open No. 178,909/1982, or a ladder type anti-skid device as disclosed in Japanese Utility Model Laid-Open No. 28,509/1988 or Patent Laid-Open No. 138,203/1979 wherein a plurality of elongated anti-skid plates extending in an axial direction of the tire are fixed to the tread of the tire by means of a fastening wire.

What is claimed is:

1. An anti-skid device for automobile tires comprising anti-skid device body having a plurality of members, and detachable first joint hooks for joining the members of the device body together, the anti-skid device body having a plurality of mutually spaced tightening end portions which extend radially inward along the side surfaces of a tire when the device body is set on the tire, ends of adjacent tightening end portions being connected to each other by a fastener so that a length of separation between the ends can be set smaller than a free length of separation between the ends by the fastener, the length of the fastener being variable, the length-variable fastener comprising a pivotably supported plate having first and second holes in a base portion and second hooks each connected at one end thereof to the end of the opposed tightening end portion, and at the other end thereof to an end of the plate, the length between the ends of the opposed tightening end portions being reduced by rotating said plate.

2. The anti-skid device for automobile tires according to claim 1, further comprising a bendable joint inserted between said end of the tightening end portion to which said length-variable fastener is to be connected and said length-variable fastener, said bendable joint being connected to said end through a third hook extending in the radial direction of the tire along the side surface of the tire.

3. The anti-skid device for automobile tires according to claim 1, wherein when the length of separation between said ends of the tightening end portions connected through said fastener is reduce by the rotation of said plate of the fastener, each of said tightening end portions is elongated resiliently.

4. The anti-skid device for automobile tires according to claim 1, wherein said first hole of the length-variable fastener is formed at a center of rotation of said plate, and said second holes are formed at positions symmetrically separated from said center of rotation of said plate.

5. The anti-skid device for automobile tires according to claim 1, wherein hook fastening hole portions of said anti-skid device body have a stepped portion which is spaced from the tire surface by a distance corresponding to the thickness of the hook so that each of the first, second and third hooks is not brought into contact directly with the tire surface.

6. The anti-skid device for automobile tires according to claim 1, further comprising lock means consisting of the second hooks pivotably inserted into said third holes of said plate and projections formed on said plate for holding said plate in the rotated state.

7. The anti-skid device for automobile tires according to claim 6, wherein said projection is formed on a surface of the plate which is on the opposite side of the tire surface so as to be brought into contact with said second hooks so that the locking force of the locking means in increased by the centrifugal force generated as the tire rotates.

8. The anti-skid device for automobile tires according to claim 1, further comprising a jig for fastening the tightening end portions of the anti-skid device, said jig comprising three projections corresponding to three holes of said first and second holes in the pivotably supported plate of the length-variable fastener to rotate said plate.

9. An anti-skid device for an automobile tire comprising:

an anti-skid device body having a plurality of members;

detachable first joint hooks for joining the members of the device body together;

the anti-skid device body having a plurality of mutually spaced tightening end portions which extend radially inward along side surfaces of the tire when the device body is set on the tire;

ends of adjacent tightening end portions being connected to each other by a length-variable fastener;

a free length of separation between the ends of the tightening end portions which can be set to a smaller length by the fastener;

the length-variable fastener comprising a pivotably supported plate having first and second holes in a base portion thereof;

second hooks each having one end thereof connected to the end of the opposed tightening end portion, and the other end thereof connected to an end of the plate;

the free length between the ends of the opposed tightening end portions being reduced to the smaller length by rotating said plate; and each end of the tightening end portions having a hook fastening hole portion which includes a stepped portion spaced from the tire surface by a distance corresponding to the thickness of the hook so that each of the first and second hooks is not brought into contact directly with the tire surface.

10. The anti-skid device for an automobile tire according to claim 9, further comprising a bendable joint inserted between said end of the tightening end portion to which said length-variable fastener is to be connected and said length-variable fastener, said bendable joint being connected to said end through a third hook extending in the radial direction of the tire along the side surface of the tire.

11. The anti-skid device for an automobile tire according to claim 9, wherein when the free length of separation between said ends of the tightening end portions connected through said fastener is reduced to the smaller length by the rotation of said plate of the fastener, each of said tightening end portions is elongated resiliently.

12. The anti-skid device for an automobile tire according to claim 9, wherein said first hole of the length-variable fastener is formed at a center of rotation of said plate, and said second holes are formed at positions symmetrically separated from said center of rotation of said plate.

13. The anti-skid device for an automobile tire according to claim 9, further comprising lock means comprising the second hooks being pivotably inserted into third holes in said plate and projections formed on said plate for holding said plate in the rotated state.

14. The anti-skid device for an automobile tire according to claim 13, wherein said projections are formed on a surface of the plate which is on the opposite side of the tire surface so as to be brought into contact with said second hooks so that the locking force of the locking means is increased by the centrifugal force generated as the tire rotates.

15. The anti-skid device for an automobile tire according to claim 9, further comprising a jig for fastening the tightening end portion of the anti-skid device, said jig comprising three projections corresponding to three holes of said first and second holes in the pivotally supported plate of the length-variable fastener to rotate said plate.

* * * * *